United States Patent
Kang et al.

(10) Patent No.: US 9,567,479 B2
(45) Date of Patent: *Feb. 14, 2017

(54) HARD COATING FILM

(71) Applicant: LG CHEM, LTD., Seoul (KR)

(72) Inventors: Joon-Koo Kang, Daejeon (KR); Eun-Kyu Her, Daejeon (KR); Soon-Hwa Jung, Daejeon (KR); Yeong-Rae Chang, Daejeon (KR); Hyeok Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/423,339

(22) PCT Filed: Jul. 29, 2013

(86) PCT No.: PCT/KR2013/006782
§ 371 (c)(1),
(2) Date: Feb. 23, 2015

(87) PCT Pub. No.: WO2014/030852
PCT Pub. Date: Feb. 27, 2014

(65) Prior Publication Data
US 2015/0299504 A1  Oct. 22, 2015

(30) Foreign Application Priority Data

Aug. 23, 2012 (KR) .................... 10-2012-0092529
Aug. 23, 2012 (KR) .................... 10-2012-0092532
Aug. 23, 2012 (KR) .................... 10-2012-0092533
Jul. 26, 2013 (KR) .................... 10-2013-0089109

(51) Int. Cl.
| | | |
|---|---|---|
| C08J 5/18 | (2006.01) | |
| C08J 7/04 | (2006.01) | |
| C08K 3/00 | (2006.01) | |
| C09D 4/06 | (2006.01) | |
| C08L 33/04 | (2006.01) | |
| C08L 51/08 | (2006.01) | |
| C09D 133/14 | (2006.01) | |
| C09D 133/04 | (2006.01) | |
| C09D 135/02 | (2006.01) | |
| C09D 143/04 | (2006.01) | |
| C09D 105/16 | (2006.01) | |
| C08K 3/36 | (2006.01) | |

(52) U.S. Cl.
CPC ............ *C09D 133/14* (2013.01); *C08J 5/18* (2013.01); *C08J 7/04* (2013.01); *C08J 7/047* (2013.01); *C08K 3/00* (2013.01); *C08L 33/04* (2013.01); *C08L 51/08* (2013.01); *C09D 4/06* (2013.01); *C09D 105/16* (2013.01); *C09D 133/04* (2013.01); *C09D 135/02* (2013.01); *C09D 143/04* (2013.01); *C08J 2351/08* (2013.01); *C08K 3/36* (2013.01); *C08K 2201/011* (2013.01); *Y10T 428/24917* (2015.01); *Y10T 428/24942* (2015.01)

(58) Field of Classification Search
None
See application file for complete search history.

(56) References Cited

U.S. PATENT DOCUMENTS

| | | |
|---|---|---|
| 5,146,531 A | 9/1992 | Shustack |
| 6,489,015 B1 | 12/2002 | Tsuchiya et al. |
| 2004/0081831 A1 | 4/2004 | Shoshi et al. |
| 2005/0136273 A1 | 6/2005 | Hashimoto et al. |
| 2007/0178297 A1 | 8/2007 | Takada et al. |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0311351 A1 | 12/2008 | Hsu et al. |
| 2009/0169896 A1 | 7/2009 | Sohn et al. |
| 2009/0202819 A1 | 8/2009 | Asahi et al. |
| 2009/0214871 A1 | 8/2009 | Fukuda et al. |
| 2010/0055377 A1 | 3/2010 | Esaki et al. |
| 2010/0084037 A1 | 4/2010 | Ericsson et al. |
| 2011/0050623 A1* | 3/2011 | Lee .................. G06F 3/041 345/174 |
| 2011/0077334 A1 | 3/2011 | Oi et al. |
| 2011/0124823 A1 | 5/2011 | Hayashi et al. |
| 2012/0019766 A1 | 1/2012 | Oki et al. |

FOREIGN PATENT DOCUMENTS

| | | |
|---|---|---|
| CN | 1286640 C | 11/2004 |
| CN | 102257087 A | 11/2011 |

(Continued)

OTHER PUBLICATIONS

JP 2000-214791, Mitsuru et al., Machine Translation provided by EPO, accessed Nov. 17, 2015.*
JP 2011-201087, Kazuko et al., Machine Translation provided by EPO, accessed Nov. 17, 2015.*
Written Opinion and Search Report issued in related international application No. PCT/KR2013/006778 on Oct. 17, 2013 along with English translation, 17 pages.
Written Opinion and Search Report issued in related international application No. PCT/KR2013/006773 on Oct. 22, 2013 along with English translation, 20 pages.
Written Opinion and Search Report issued in related international application No. PCT/KR2013/006775 on Oct. 25, 2013 along with English translation, 25 pages.
Written Opinion and Search Report issued in related international application No. PCT/KR2013/006780 on Nov. 27, 2013 along with English translation, 20 pages.

(Continued)

*Primary Examiner* — Humera Sheikh
*Assistant Examiner* — Lucas Wang
(74) *Attorney, Agent, or Firm* — Rothwell, Figg, Ernst & Manbeck, P.C.

(57) ABSTRACT

The present invention relates to a hard coating film, and, more particularly, to a hard coating film having hardness and excellent physical properties. According to the present invention, the hard coating film has high physical properties including hardness, scratch resistance, transparency, durability, light resistance, and light transmittance. Thus, the hard coating film can find useful applications in various fields thanks to its excellent physical properties.

19 Claims, No Drawings

(56) References Cited

FOREIGN PATENT DOCUMENTS

| | | |
|---|---|---|
| EP | 2397527 A1 | 12/2011 |
| EP | 2 840 107 A1 | 2/2015 |
| EP | 2 840 109 A1 | 2/2015 |
| EP | 2 840 110 A1 | 2/2015 |
| EP | 2 842 989 A1 | 3/2015 |
| EP | 2 843 008 A1 | 3/2015 |
| EP | 2857440 A1 | 4/2015 |
| JP | 2000015734 A | 1/2000 |
| JP | 2000-071392 A | 3/2000 |
| JP | 2000-214791 A | 8/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-288787 A | 10/2005 |
| JP | 2006-233167 A | 9/2006 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008116596 A | 5/2008 |
| JP | 2008-138165 A | 6/2008 |
| JP | 2008129130 A | 6/2008 |
| JP | 2008-150484 A | 7/2008 |
| JP | 2008197662 A | 8/2008 |
| JP | 2008-310286 A | 12/2008 |
| JP | 2009-204725 A | 9/2009 |
| JP | 2009204727 A | 9/2009 |
| JP | 2009-241458 A | 10/2009 |
| JP | 2010-017991 A | 1/2010 |
| JP | 2010-052334 A | 3/2010 |
| JP | 2010-053231 A | 3/2010 |
| JP | 2010121013 A | 6/2010 |
| JP | 2010-173234 A | 8/2010 |
| JP | 2010-284910 A | 12/2010 |
| JP | 2011-031457 A | 2/2011 |
| JP | 2011-031527 A | 2/2011 |
| JP | 2011022456 A | 2/2011 |
| JP | 2011504828 A | 2/2011 |
| JP | 2011-178910 A | 9/2011 |
| JP | 2011-201087 A | 10/2011 |
| JP | 2011-246548 A | 12/2011 |
| JP | 2012-081742 A | 4/2012 |
| JP | 4911474 B2 | 4/2012 |
| JP | 2012066477 A | 4/2012 |
| JP | 2013-095108 A | 5/2013 |
| KR | 10-1999-0072670 A | 9/1999 |
| KR | 10-2000-0021805 A | 4/2000 |
| KR | 10-2000-0021806 A | 4/2000 |
| KR | 10-2004-0037081 A | 4/2004 |
| KR | 10-2004-0097189 A | 11/2004 |
| KR | 10-2006-0009194 A | 1/2006 |
| KR | 1020060072072 A | 6/2006 |
| KR | 100730414 B1 | 6/2007 |
| KR | 10-2008-0005839 A | 1/2008 |
| KR | 10-2008-0055698 A | 6/2008 |
| KR | 10-0852562 B1 | 8/2008 |
| KR | 100852561 B1 | 8/2008 |
| KR | 10-2008-0109658 A | 12/2008 |
| KR | 1020090006131 A | 1/2009 |
| KR | 10-0884079 B1 | 2/2009 |
| KR | 10-2009-0044089 A | 5/2009 |
| KR | 1020090045105 A | 5/2009 |
| KR | 1020090047529 A | 5/2009 |
| KR | 10-2009-0063182 A | 6/2009 |
| KR | 1020090061821 A | 6/2009 |
| KR | 10-2009-0073668 A | 7/2009 |
| KR | 10-0905683 B1 | 7/2009 |
| KR | 10-0926220 B1 | 11/2009 |
| KR | 10-2012-0002366 A | 1/2010 |
| KR | 10-2010-0026014 A | 3/2010 |
| KR | 10-2010-0041992 A | 4/2010 |
| KR | 10-2010-0055160 A | 5/2010 |
| KR | 1020100045997 A | 5/2010 |
| KR | 10-2010-0129512 A | 12/2010 |
| KR | 10-2010-0132786 A | 12/2010 |
| KR | 10-2010-0132786 A1 | 12/2010 |
| KR | 10-2011-0034324 A | 4/2011 |
| KR | 10-2011-0037622 A | 4/2011 |
| KR | 101028463 B1 | 4/2011 |
| KR | 10-2011-0058743 A | 6/2011 |
| KR | 10-2011-0071480 A | 6/2011 |
| KR | 10-2011-0103885 A | 9/2011 |
| KR | 1020110119704 A | 11/2011 |
| KR | 10-2011-0130142 A | 12/2011 |
| KR | 10-1127952 B1 | 3/2012 |
| KR | 101114932 B1 | 3/2012 |
| KR | 10-2012-0058635 A | 6/2012 |
| KR | 10-1150719 B1 | 6/2012 |
| KR | 10-1168073 B1 | 7/2012 |
| KR | 10-2012-0136597 A | 12/2012 |
| KR | 101295325 B1 | 8/2013 |
| TW | 200907401 A | 2/2009 |
| TW | 201041985 A | 12/2010 |
| TW | 201130880 A | 9/2011 |
| TW | 201202403 A | 1/2012 |
| TW | I357922 B | 2/2012 |
| WO | 2006046855 A1 | 5/2006 |
| WO | WO 2008-098872 A1 | 8/2008 |
| WO | 2011/105532 A1 | 9/2011 |
| WO | 2012/026475 A1 | 3/2012 |
| WO | 2012/060145 A1 | 5/2012 |

OTHER PUBLICATIONS

Written Opinion and Search Report issued in related international application No. PCT/KR2013/006781 on Nov. 27, 2013 along with English translation, 18 pages.

Written Opinion and Search Report issued in related international application No. PCT/KR2013/006782 on Nov. 27, 2013 along with English translation, 20 pages.

Communication from European Patent Office in corresponding application EP 13797819.3 mailed Dec. 17, 2015, 12 pages.

Extended Search Report dated Jan. 29, 2016 of EP Patent Application No. 13830624.6 (9 pages).

Extended Search Report dated Mar. 15, 2016 of EP Patent Application No. 13830681.6 (10 pages).

Extended Search Report dated Apr. 6, 2016 of EP Patent Application No. 13831101.4 (8 pages).

Extended Search Report dated Apr. 6, 2016 of EP Patent Application No. 13831327.5 (8 pages).

Extended Search Report dated Mar. 11, 2016 of EP Patent Application No. 13830272.4 (7 pages).

Extended Search Report dated Mar. 14, 2016 of EP Patent Application No. 13830709.5 (9 pages).

Extended Search Report dated Apr. 4, 2016 of EP Patent Application No. 13830724.4 (11 pages).

Shin-Nakamura Chemical Industry Co., Ltd., [Sep. 20, 2016]- Product List, Photo curable monomers/oligomers: Urethane acrylates with English translation (2 pages).

"Ciba TINUVIN 900 Light Stabilizer", Ciba Specialty Chemicals, (1997), pp. 1-3.

* cited by examiner

HARD COATING FILM

CROSS REFERENCE TO RELATED APPLICATIONS

This application is a 35 U.S.C. §371 National Phase Entry Application from PCT/KR2013/006782, filed on Jul. 29, 2013, and designating the United States, which claims priority under 35 U.S.C. §119 to Korean Patent Application No. 10-2012-0092529 filed on Aug. 23, 2012, Korean Patent Application No. 10-2012-0092532 filed on Aug. 23, 2012, Korean Patent Application No. 10-2012-0092533 filed on Aug. 23, 2012, and to Korean Patent Application No. 10-2013-0089109 filed on Jul. 26, 2013, which are incorporated herein by reference in their entireties.

BACKGROUND OF THE INVENTION

1. Field of the Invention

The present invention relates to a hard coating film, and, more particularly, to a hard coating film having excellent physical properties, including hardness and impact resistance.

This application claims the benefit of Korean Patent Application No. 10-2012-0092529, filed on Aug. 23, 2012, Korean Patent Application No. 10-2012-0092532, filed on Aug. 23, 2012, Korean Patent Application No. 10-2012-0092533, filed on Aug. 23, 2012, and Korean Patent Application No. 10-2013-0089109, filed on Jul. 26, 2013, which are all hereby incorporated by reference in their entireties into this application.

2. Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of mobile applications being heavy due to the weight thereof and glass being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a minimal thickness to ensure the surface hardness of the hard coating layer. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on hard coating films, without the problems of cracking and setting shrinkage-induced curling. Korean Patent Application Publication No. 2010-0041992 discloses a hard coating film composition, free of monomers, comprising a binder resin based on ultraviolet-curable polyurethane acrylate oligomers. However, this hard coating film has a pencil hardness of about 3H, and thus the strength thereof is not sufficient to be a substitute for glass panels for displays.

SUMMARY OF THE INVENTION

Accordingly, the present invention has been made keeping in mind the above problems occurring in the prior art, and an object of the present invention is to provide a hard coating film which retains high hardness and superior impact resistance.

In order to accomplish the above object, the present invention provides a hard coating film, comprising:
a supporting substrate;
a first hard coating layer, formed on one side of the supporting substrate and having an elongation strain of 4% or more in a stress-strain curve as measured by ASTM D882; and
a second hard coating layer, formed on the other side of the supporting substrate.

According to the present invention, the hard coating film can exhibit high hardness, impact resistance, scratch resistance and transparency, and thus can be usefully applied to touch panels of mobile terminals, smart phones or tablet PCs, and as a cover or device panel for various displays, in substitution for glass.

DESCRIPTION OF THE PREFERRED EMBODIMENTS

The present invention addresses a hard coating film, comprising:
a supporting substrate;
a first hard coating layer, formed on one side of the supporting substrate and having an elongation strain of 4% or more in a stress-strain curve as measured by ASTM D882; and
a second hard coating layer, formed on the other side of the supporting substrate.

All of the terms used in the specification are taken only to illustrate embodiments, and are not intended to limit the present invention. As used herein and in the appended claims, the singular forms "a," "an," and "the" include plural references unless the context clearly dictates otherwise.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, a detailed description will be given of a hard coating film according to the present invention.

An aspect of the present invention provides a hard coating film, comprising a supporting substrate; a first hard coating layer, formed on one side of the supporting substrate and having an elongation strain of 4% or more in a stress-strain curve as measured by ASTM D882; and a second hard coating layer, formed on the other side of the supporting substrate.

In the hard coating film of the present invention, the first hard coating layer has an elongation strain of 4% or more in a stress-strain curve, as measured by ASTM D882.

According to an embodiment of the present invention, the elongation strain of the first hard coating layer may be about 4% or more, for example, about 4 to about 12%, about 4 to about 10%, or about 4 to about 8%.

In the hard coating film of the present invention, the first hard coating layer has an elongation strain of 4% or more, thereby exhibiting bending resistance and flexibility to thus decrease generation of curls or cracks, so that the hard coating film of the present invention may manifest superior processability. On the other hand, the second hard coating layer formed on the other side of the supporting substrate may manifest high hardness and scratch resistance adapted to prevent damage due to external impact or friction.

As mentioned above, the hard coating film of the present invention is configured such that a supporting substrate is sandwiched between two hard coating layers one of which is provided with high elongation to ensure flexibility, with the other provided with high hardness and scratch resistance to give dual properties, and thus, the hard coating film is less prone to curling or cracking with high enough physical strength to be a substitute for glass, yet maintaining superior processability.

According to an embodiment of the present invention, the first hard coating layer has a first elastic modulus, and the second hard coating layer has a second elastic modulus. As such, a difference between the first and second elastic moduli may be 500 MPa or more.

As used herein, the elastic modulus indicates a value measured by ASTM D882.

The hard coating film of the present invention includes two hard coating layers having different elastic moduli respectively formed on both sides of the supporting substrate, and the elastic modulus of one hard coating layer is greater by at least 500 MPa than that of the other hard coating layer. Thus, the hard coating layer having a greater elastic modulus exhibits high physical strength such as high hardness, etc., whereas the hard coating layer having a comparatively lower elastic modulus may manifest impact resistance and bending resistance. Accordingly, the hard coating film having the above physical properties may manifest superior processability because it retains high enough physical strength to be a substitute for glass and is less prone to curling or cracking.

In one embodiment of the present invention, the difference between the first and second elastic moduli is about 500 MPa or more, for example, about 500 to about 3000 MPa, about 500 to about 2500 MPa, or about 500 to about 2000 MPa.

In another embodiment of the present invention, the first elastic modulus is about 1500 MPa or less, for example, about 300 to modulus 1500 MPa, about 300 to modulus 1200 MPa, or about 300 to modulus 1000 MPa, and the second elastic modulus may be about 2000 MPa or more, for example, about 2000 to modulus 3500 MPa, about 2000 to modulus 3000 MPa, or about 2000 to modulus 2800 MPa.

When the first and second elastic moduli and the difference therebetween fall in the above ranges, the resulting hard coating film has high enough physical strength to be a substitute for glass and is less prone to curling or cracking, and may thus exhibit high hardness and impact resistance.

In the hard coating film of the present invention, any material for the supporting substrate on which the first and second hard coating layers are formed may be used so long as it is a typical transparent plastic resin, without particular limitations in terms of methods or materials for manufacturing supporting substrates such as stretched or unstretched films. More specifically, according to an embodiment of the present invention, the supporting substrate may include, for example, films made of polyester such as polyethyleneterephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA), a fluorine resin, etc. The supporting substrate may be provided in the form of a single layer structure, or a multilayer structure including two or more layers composed of the same or different materials, as necessary, but is not particularly limited.

In one embodiment of the present invention, the supporting substrate may be a multilayered substrate made of polyethyleneterephthalate (PET) or a substrate including two or more layers resulting from co-extrusion of polymethylmethacrylate (PMMA)/polycarbonate (PC).

In another embodiment of the present invention, the supporting substrate may be a substrate including a copolymer of polymethylmethacrylate (PMMA) and polycarbonate (PC).

Although the thickness of the supporting substrate is not particularly limited, it may fall in the range of about 30 to about 1,200 μm, or about 50 to about 800 μm.

The hard coating film of the present invention includes first and second hard coating layers respectively formed on both sides of the supporting substrate.

Any component that meets the elongation strain conditions set forth above may be used in the first hard coating layer, without particular limitation. In one embodiment of the present invention, the first hard coating layer may contain a photocurable crosslinking copolymer of a tri- to hexa-functional acrylate monomer.

As used herein, the term "acrylate" is intended to encompass acrylate, methacrylate, and derivatives thereof with various substituents.

Examples of the tri- to hexa-functional acrylate monomer include trimethylolpropane triacrylate (TMPTA), trimethylolpropane ethoxy triacrylate (TMPEOTA), glycerinpropoxylated triacrylate (GPTA), pentaerythritol tetraacrylate (PETA), dipentaerythritol hexaacrylate (DPHA), etc. These tri- to hexa-functional acrylate monomers may be used alone or in combination.

In another embodiment of the present invention, the first hard coating layer may contain a photocurable crosslinking copolymer of a mono- to bi-functional acrylate monomer in addition to the tri- to hexa-functional acrylate monomer.

Examples of the mono- to bi-functional acrylate monomer include hydroxyethyl acrylate (HEA), hydroxyethyl methacrylate (HEMA), hexanediol diacrylate (HDDA), tripropylene glycol diacrylate (TPGDA), ethylene glycol diacrylate (EGDA), etc. These mono- to bi-functional acrylate monomers may be used alone or in combination.

When the first hard coating layer contains a photocurable crosslinking copolymer of the mono- to bi-functional acrylate monomer in addition to the tri- to hexa-functional acrylate monomer, the weight ratio of the mono- to bi-functional acrylate monomer to the tri- to hexa-functional acrylate monomer is not particularly limited, but may be on the order of about 1:99 to about 50:50, about 10:90 to about 50:50, or about 20:80 to about 40:60. Given the weight ratio set forth above, the mono- to bi-functional acrylate monomer and the tri- to hexa-functional acrylate monomer may impart high hardness and flexibility to the first hard coating layer without deteriorating other physical properties such as a curl property, light resistance, etc.

In still another embodiment of the present invention, the first hard coating layer may contain a photocurable crosslinking copolymer of a photocurable elastic polymer in addition to the tri- to hexa-functional acrylate monomer.

As used herein, the term "photocurable elastic polymer" refers to a polymer which is elastic and contains a functional group that undergoes UV light-triggered crosslink polymerization.

According to an embodiment of the present invention, the photocurable elastic polymer may have an elongation of about 15% or more, for example, about 15 to about 200%, about 20 to about 200%, or about 20 to about 150%, as measured by ASTM D638.

The photocurable elastic polymer is crosslink polymerized with the tri- to hexa-functional acrylate monomer and then cured to give a first or second hard coating layer, thus appropriately imparting high hardness, flexibility and impact resistance to the first or second hard coating layer.

According to an embodiment of the present invention, the photocurable elastic polymer may be a polymer or oligomer having a weight average molecular weight of about 1,000 to about 600,000 g/mol, or about 10,000 to about 600,000 g/mol.

The photocurable elastic polymer may include at least one selected from the group consisting of polycaprolactone, a urethane acrylate polymer, and polyrotaxane.

Among the polymers usable as the photocurable elastic polymer, polycaprolactone is formed by the ring-opening polymerization of caprolactone, and has excellent physical properties such as flexibility, impact resistance, durability and the like.

A urethane acrylate polymer has excellent elasticity and durability because of a urethane bond retained therein.

Polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include a rotaxane compound comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

No particular limitations are imposed on the macrocycle if it is large enough to surround the thread moiety. The macrocycle may include a functional group such as a hydroxyl group, an amino group, a carboxyl group, a thiol group, an aldehyde group or the like, which may react with other polymers or compounds. Specific examples of the macrocycle may include α-cyclodextrin, β-cyclodextrin, γ-cyclodextrin and mixtures thereof.

Furthermore, the thread may be used without limitation as long as it is generally linear in shape with a predetermined weight or greater. Preferably, a polyalkylene compound or a polylactone compound may be used in the thread. Specifically, a polyoxyalkylene compound including an oxyalkylene repetitive unit of 1 to 8 carbon atoms or a polylactone compound including a lactone repetitive unit of 3 to 10 carbon atoms may be used in the thread.

Meanwhile, the stopper may be appropriately adjusted depending on the characteristics of the rotaxane compound to be prepared. For example, the stopper may include at least one selected from the group consisting of a dinitrophenyl group, a cyclodextrin group, an amantane group, a trityl group, a fluorescein group and a pyrene group.

According to an embodiment of the present invention, as the first hard coating layer contains a photocurable crosslinking copolymer formed by photocuring the photocurable elastic polymer additionally, it allows the hard coating film to have high hardness and flexibility, and particularly ensures excellent resistance to external impact, thus preventing damage to the hard coating film due to impact.

Meanwhile, the first hard coating layer may further include a surfactant, a yellowing inhibitor, a leveling agent, an antifouling agent, etc., which are additives typically used in the art to which the present invention belongs, in addition to the above-mentioned photocurable crosslinking copolymer. Furthermore, the amount thereof may be variously adjusted within a range that does not deteriorate the physical properties of the hard coating film of the present invention, and is not particularly limited but may be, for example, about 0.1 to about 10 weight parts based on 100 weight parts of the photocurable crosslinking copolymer.

According to an embodiment of the present invention, for example, the first hard coating layer may include a surfactant as an additive. The surfactant may be a mono- or bi-functional fluoro-acrylate, a fluorine surfactant or a silicon surfactant. In this context, the surfactant may be contained in a dispersed or crosslinked form in the crosslinking copolymer. Also, the first hard coating layer may include a yellowing inhibitor as an additive. The yellowing inhibitor may be a benzophenone compound or a benzotriazole compound.

According to an embodiment of the present invention, the first hard coating layer may have a thickness of 50 μm or more, for example, about 50 to about 300 μm, about 50 to about 200 μm, about 50 to about 150 μm, or about 70 to about 150 μm.

The first hard coating layer may be formed by photocuring a first hard coating composition comprising a first binder monomer, a photoinitiator, and optionally an organic solvent, and an additive after application onto the substrate.

The first binder monomer may comprise the tri- to hexa-functional acrylate monomer. In accordance with one embodiment, the first binder monomer may comprise the mono- to bi-functional acrylate monomer and/or the photocurable elastic polymer, in addition to the tri- to hexa-functional acrylate monomer.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, etc. Furthermore, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F and so on. These photoinitiators may be used alone or in combination.

In the hard coating film of the present invention, the first hard coating composition may be used in a solvent free manner, or may comprise an organic solvent. In the latter case, it is advantageous to adjust the viscosity and fluidity of the composition and to increase the coatability of the composition.

Examples of the organic solvent include alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

In the hard coating film of the present invention, when the first hard coating composition further includes an organic solvent, the organic solvent may be contained so that the weight ratio of the solid fraction of the first hard coating composition to the organic solvent is about 70:30 to about 99:1. As such, when the first hard coating composition has a high solid content, the hard coating composition increases in viscosity, and thus can allow for a thick coating, for example, form a hard coating layer at a thickness of 50 µm or more.

According to an embodiment of the present invention, any viscosity may be given to the first hard coating composition if it ensures the first hard coating composition proper fluidity and coatability. However, a high solid content leads to high viscosity. For example, the first hard coating composition of the present invention may range in viscosity at 25° C. from about 100 to about 1,200 cps, from about 150 to about 1,200 cps, or from about 300 to about 1,200 cps.

Any component may be used in the second hard coating layer, without particular limitations. In one embodiment of the present invention, the second hard coating layer may contain a photocurable crosslinking copolymer of a tri- to hexa-functional acrylate monomer, which may be the same as or different from that used in the first hard coating layer.

In another embodiment of the present invention, the second hard coating layer may contain a photocurable crosslinking copolymer of a mono- to bi-functional acrylate monomer in addition to the tri- to hexa-functional acrylate monomer.

In still another embodiment of the present invention, the second hard coating layer may contain a photocurable crosslinking copolymer of a photocurable elastic polymer in addition to the tri- to hexa-functional acrylate monomer.

For details including the descriptions, illustrative compounds and amounts of the tri- to hexa-functional acrylate monomer, the mono- to bi-functional acrylate monomer, the photocurable elastic polymer, and the additives in the second hard coating layer, reference may be made to those of the first hard coating layer. They may be the same as or different from those containing in the first hard coating layer.

According to an embodiment of the present invention, the second hard coating layer comprises inorganic particles dispersed in the photocurable crosslinking copolymer.

According to an embodiment of the present invention, the inorganic particles may be inorganic nanoparticles having a particle size of about 100 nm or less, about 10 to about 100 nm, or about 10 to about 50 nm. For example, the inorganic particles may include silica particles, aluminum oxide particles, titanium oxide particles or zinc oxide particles.

The inorganic particles in the hard coating layer make an additional contribution to enhancing the hardness of the hard coating film.

When inorganic particles are further contained in the second hard coating layer, their content ratio to the photocurable crosslinking copolymer is not particularly limited. In one embodiment, the weight ratio of the photocurable crosslinking copolymer to the inorganic particles may be about 40:60 to about 90:10, or about 50:50 to about 80:20. Given the amounts of the photocurable crosslinking copolymer and the inorganic particles within the ranges set forth above, the hard coating film can be formed with an improvement in hardness within a range that does not deteriorate the physical properties thereof.

Meanwhile, the second hard coating layer may further include typical additives such as a surfactant, a yellowing inhibitor, a leveling agent, an antifouling agent and the like, which are typically used in the art to which the present invention belongs, in addition to the above-mentioned photocurable crosslinking copolymer and inorganic particles.

According to an embodiment of the present invention, the second hard coating layer may have a thickness of 50 µm or more, for example, about 50 to about 300 µm, about 50 to about 200 µm, about 50 to about 150 µm, or about 70 to about 150 µm.

The second hard coating layer may be formed by photocuring a second hard coating composition comprising a second binder monomer, a photoinitiator, and optionally an organic solvent, inorganic particles and an additive after application onto the supporting substrate.

The second binder monomer may comprise the tri- to hexa-functional acrylate monomer. In accordance with one embodiment, the second binder monomer may comprise the mono- to bi-functional acrylate monomer and/or the photocurable elastic polymer, in addition to the tri- to hexa-functional acrylate monomer.

The photoinitiator used in the second hard coating composition may be the same as or different from that used in the first hard coating composition. For details of the photoinitiator, reference may be made to the description of the first hard coating composition. These photoinitiators may be used alone or in combination.

Also, the organic solvent used in the second hard coating composition may be the same as or different from that used in the first hard coating composition. For details of the organic solvent, reference may be made to the description of the first hard coating composition.

In the hard coating film of the present invention, when the second hard coating composition includes an organic solvent, the solid fraction may be used at a weight ratio of about 70:30 to about 99:1 with regard to the organic solvent. As the second hard coating composition has a high solid content, the hard coating composition increases in viscosity, and thus can allow for a thick coating, for example, form a hard coating layer at a thickness of 50 µm or more.

According to an embodiment of the present invention, any viscosity may be given to the hard coating composition if it ensures the second hard coating composition proper fluidity and coatability. However, a high solid content leads to a high viscosity. For example, the second hard coating composition of the present invention may range in viscosity at 25° C. from about 100 to about 1,200 cps, from about 150 to about 1,200 cps, or from about 300 to about 1,200 cps.

In accordance with one embodiment, the hard coating film of the present invention may further comprise at least one layer, membrane or film, such as a plastic resin film, an adhesive film, a releasable film, an electrically conductive film, an electrically conductive layer, a coating layer, a curable resin layer, a non-conductive film, a metal mesh layer or a patterned metal layer, on the first hard coating layer or the second hard coating layer. In addition, the layer, membrane or film may take any form such as a monolayer, a bilayer or a lamination. The layer, membrane or film may be constructed on the first hard coating layer or the second hard coating layer by laminating a freestanding film with the aid of an adhesive or an adhesive film, or by coating, deposition, or sputtering, but the present invention is not limited thereto.

Particularly, the layer, membrane or film may be brought into direct contact with the first hard coating layer to allow the hard coating film to improve in resistance against external impact and scratch.

In the hard coating film according to the present invention, the first and second hard coating compositions may be applied onto one side and the other side of the supporting substrate, respectively, in a sequential or simultaneous manner before photocuring.

The hard coating film according to the present invention may be manufactured in the following manner.

Specifically, the first hard coating composition comprising the above-mentioned components is applied onto one side of the supporting substrate and photocured to form a first hard coating layer.

Any method that is available in the art may be used in the application of the first hard coating composition to form the first hard coating layer without particular limitations. For example, the first hard coating composition comprising the above-mentioned components is applied on one side of the supporting substrate. As such, a process for applying the first hard coating composition is not particularly limited so long as it is useful in the art to which the present invention belongs, and may be exemplified by bar coating, knife coating, roll coating, blade coating, die coating, microgravure coating, comma coating, slot die coating, lip coating, solution casting or the like.

Next, the applied first hard coating composition is photocured under UV light to form a first hard coating layer.

UV radiation may be emitted at a dose of about 20 to about 600 $mJ/cm^2$, or about 50 to about 500 $mJ/cm^2$. Any light source that is used in the art may be applied to the present invention without particular limitation. For example, a high-pressure mercury lamp, a metal halide lamp, a black light fluorescent lamp or the like may be used. The photocuring may be carried out by irradiation of UV light at the dose for about 30 sec to about 15 min, or for about 1 to about 10 min.

After being completely cured, the first hard coating layer may have a thickness of about 50 to about 300 μm, about 50 to 200 μm, about 50 to about 150 μm, or about 70 to about 150 μm.

The presence of the first hard coating layer ensures the high hardness of the hard coating film without negatively affecting the curl property.

Subsequently, the second hard coating composition comprising the above-mentioned components is applied onto the other side, that is, the back side of the supporting substrate. Then, the applied second hard coating composition is cured to form a second hard coating layer after exposure to UV light. During the photocuring of the second hard coating composition, UV light is radiated onto a side opposite the side coated with the first hard coating composition. Thus, the curl which may be generated by setting shrinkage in the former photocuring step is counterbalanced to afford a flat hard coating film. No additional flattening processes are thus needed.

UV light may be emitted at a dose of about 20 to about 600 $mJ/cm^2$, or about 50 to about 500 $mJ/cm^2$. Any light source that is used in the art can be applied to the present invention without particular limitation. For example, a high-pressure mercury lamp, a metal halide lamp, a black light fluorescent lamp or the like may be used. The photocuring may be carried out by irradiation of UV light at the dose for about 30 sec to about 15 min, or for about 1 to about 10 min.

After being completely cured, the second hard coating layer may have a thickness of about 50 to about 300 μm, about 50 to about 200 μm, about 50 to about 150 μm, or about 70 to about 150 μm.

In the method of manufacturing the hard coating film according to one embodiment, coating and photocuring steps of the first hard coating composition may be performed in advance of or following those of the second hard coating composition.

For use as a cover for mobile terminals or tablet PCs, the hard coating film must have hardness or impact resistance elevated sufficiently to be a substitute for glass. Even when formed at a high thickness on the substrate, the hard coating layer of the present invention is less prone to curling or cracking, and imparts the hard coating film with high transparency and impact resistance.

The hard coating film according to the present invention is superior in hardness, scratch resistance, transparency, durability, light resistance, and light transmittance.

The impact resistance of the hard coating film of the present invention is high enough to be a substitute for glass. For example, the hard coating film of the present invention may not crack even after a steel ball weighing 22 g is freely dropped ten times from a height of 50 cm thereto.

In addition, the second hard coating layer in the hard coating film of the present invention may have a pencil hardness of 7H or more, 8H or more, or 9H or more at a load of 1 kg.

Furthermore, after the second hard coating layer in the hard coating film of the present invention is tested by double rubbing 400 times with a steel wool #0000 under a load of 500 g on a friction tester, only two or less scratches may appear.

The hard coating film of the present invention may have a light transmittance of 91.0% or more, or 92.0% or more, and a haze of 1.0% or less, 0.5% or less, or 0.4% or less.

Furthermore, the hard coating film of the present invention may have an initial color b value of 1.0 or less. After the hard coating film is exposed to UV-B under an ultraviolet lamp for 72 hr or longer, it may have a color b* value which differs from the pre-exposed color b* value by 0.5 or less, or by 0.4 or less.

When the hard coating film of the present invention is disposed on a plane after exposure to a temperature of 50° C. or higher at a humidity of 80% or higher for 70 hr or longer, the maximum distance at which each edge or side of the hard coating film is spaced apart from the plane may be about 1.0 mm or less, about 0.6 mm or less, or about 0.3 mm or less. More particularly, when the hard coating film of the present invention is disposed on a plane after exposure to a temperature of 50 to 90° C. at a humidity of 80 to 90% for 70 to 100 hr, each edge or side of the hard coating film is spaced apart from the plane by about 1.0 mm or less, about 0.6 mm or less, or about 0.3 mm or less, maximally.

The hard coating film of the present invention can exhibit excellent physical properties including hardness, impact resistance, scratch resistance, transparency, durability, light resistance, and light transmittance, and thus has useful applications in various fields. For example, the hard coating film of the present invention can be used in the touch panels of mobile terminals, smart phones or tablet PCs, and as covers or device panels for various displays.

A better understanding of the present invention may be obtained through the following examples which are set forth to illustrate, but are not to be construed as limiting the present invention.

EXAMPLES

Preparation Example 1

Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck], 110 mg of hydroquinone monomethylene ether, and 315 g of methyl ethyl ketone. Then, the mixture was reacted at 70° C. for 5 hr to obtain polyrotaxane in which polylactone with an acrylate moiety conjugated to the end thereof acting as the macrocycle while cyclodextrin was positioned as the stopper.

The polyrotaxane had a weight average molecular weight of 600,000 g/mol, and was found to have an elongation of 20%, as measured by ASTM D638.

Example 1

A first hard coating composition was prepared by mixing 6 g of trimethylolpropane triacrylate (TMPTA), 4 g of the polyrotaxane of Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430) and 1 g of methyl ethyl ketone.

A second hard coating composition was prepared by mixing 9 g of a silica-dipentaerythritolhexaacrylate (DPHA) composite in which silica nanoparticles with a particle size of 20~30 nm were dispersed by about 40 wt % (silica 3.6 g, DPHA 5.4 g), 1 g of the polyrotaxane of Preparation Example 1, 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The second hard coating composition was applied onto a PET substrate 188 μm thick with a size of 15 cm×20 cm, and then subjected to first photocuring by exposure to 280-350 nm UV light using a black light fluorescent lamp.

Subsequently, the first hard coating composition was applied onto the back side of the substrate, and then exposed to 280~350 nm UV light using a black light fluorescent lamp to give a hard coating film. After completion of the curing, each of the first and second hard coating layers formed on both sides of the substrate was 100 μm thick.

Example 2

A hard coating film was manufactured in the same manner as in Example 1, with the exception that 4 g of a urethane acrylate polymer (brand name: UA200PA, Shin Nakamura Chemical Co. Ltd., weight average molecular weight: 2,600 g/mol, elongation measured by ASTM D638: 170%) was used instead of 4 g of the polyrotaxane of Preparation Example 1 in the first hard coating composition, and 1 g of a urethane acrylate polymer (brand name: UA200PA) was used instead of 1 g of the polyrotaxane of Preparation Example 1 in the second hard coating composition.

Example 3

A hard coating film was manufactured in the same manner as in Example 1, with the exception that 4 g of a urethane acrylate polymer (brand name: UA340P, Shin Nakamura Chemical Co. Ltd., weight average molecular weight: 13,000 g/mol, elongation measured by ASTM D638: 150%) was used instead of 4 g of the polyrotaxane of Preparation Example 1 in the first hard coating composition, and 1 g of a urethane acrylate polymer (brand name: UA340P) was used instead of 1 g of the polyrotaxane of Preparation Example 1 in the second hard coating composition.

Example 4

A hard coating film was manufactured in the same manner as in Example 1, with the exception that 1 g of a urethane acrylate polymer (brand name: UA200PA) was used instead of 1 g of the polyrotaxane of Preparation Example 1 in the second hard coating composition.

Example 5

A hard coating film was manufactured in the same manner as in Example 1, with the exception that 1 g of a urethane acrylate polymer (brand name: UA340P) was used instead of 1 g of the polyrotaxane of Preparation Example 1 in the second hard coating composition.

Example 6

A hard coating film was manufactured in the same manner as in Example 1, with the exception that the each of the first and second hard coating layers formed on both sides of the substrate after completion of the curing in Example 1 was 150 μm thick.

Example 7

A first hard coating composition was prepared by mixing 5 g of trimethylolpropane triacrylate (TMPTA), 5 g of the polyrotaxane of Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methyl ethyl ketone.

A second hard coating composition was prepared by mixing 2 g of hydroxyethylacrylate (HEA), 8 g of a silica-dipentaerythritolhexaacrylate (DPHA) composite in which silica nanoparticles with a particle size of 20~30 nm were dispersed by 40 wt % (silica 3.2 g, DPHA 4.8 g), 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The second hard coating composition was applied onto a PET substrate 188 μm thick with a size of 15 cm×20 cm, and then subjected to first photocuring by exposure to 280~350 nm UV light using a black light fluorescent lamp.

Subsequently, the first hard coating composition was applied onto the back side of the substrate, and then subjected to second photocuring by exposure to 280~350 nm UV light using a black light fluorescent lamp to give a hard coating film. After completion of the curing, the first hard coating layer was 125 μm thick, and the second hard coating layer was 100 μm thick.

Comparative Example 1

A first hard coating composition was prepared by mixing 10 g of trimethylolpropane triacrylate (TMPTA), 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methyl ethyl ketone.

A second hard coating composition was prepared by mixing g of a silica-dipentaerythritolhexaacrylate (DPHA) composite in which silica nanoparticles with a particle size of 20~30 nm were dispersed by about 40 wt % (silica 4 g, DPHA 6 g), 0.1 g of a benzotriazole-based yellowing inhibitor (brand name: Tinuvin 400), and 0.05 g of a fluorine surfactant (brand name: FC4430).

The second hard coating composition was applied onto a PET substrate 188 μm thick with a size of 15 cm×20 cm, and then subjected to first photocuring by exposure to 280~350 nm UV light using a black light fluorescent lamp.

Subsequently, the first hard coating composition was applied onto the back side of the substrate, and then subjected to second photocuring by exposure to 280~350 nm UV light using a black light fluorescent lamp to give a hard coating film. After completion of the curing, each of the first and second hard coating layers formed on both sides of the substrate was 100 μm thick.

Elongation strains measured by ASTM D882 and elastic moduli of the hard coating films of Examples 1 to 7 and Comparative Example 1 are summarized in Table 1 below.

TABLE 1

|  | Elongation Strain of 1$^{st}$ Hard Coating layer (unit: %) | Elastic Modulus of 1$^{st}$ Hard Coating layer (unit: MPa) | Elastic Modulus of 2$^{nd}$ Hard Coating layer (unit: MPa) | Difference in Elastic Modulus (unit: MPa) |
|---|---|---|---|---|
| Ex. 1 | 4.5 | 600 | 2500 | 1900 |
| Ex. 2 | 4.8 | 550 | 2300 | 1750 |
| Ex. 3 | 6.3 | 400 | 2350 | 1950 |
| Ex. 4 | 4.5 | 600 | 2300 | 1700 |
| Ex. 5 | 4.5 | 600 | 2350 | 1750 |
| Ex. 6 | 5.2 | 600 | 2500 | 1900 |
| Ex. 7 | 4.8 | 400 | 2500 | 2100 |
| C. Ex. 1 | 1.7 | 3100 | 3300 | 200 |

TEST EXAMPLES

Measurement Method

1) Pencil Hardness

The second hard coating layer was evaluated for pencil hardness according to the Japanese Standard JIS K5400. In this regard, the hard coating film was doubly rubbed three times with a pencil hardness meter under a load of 1.0 kg to determine the hardness at which no scratches appeared.

2) Scratch Resistance

The hard coating film was doubly rubbed 400 times with a steel wool (#0000) under a load of 0.5 kg on a friction tester, and scratches thus formed on the second hard coating layer were counted. Evaluation was made of the scratch resistance of the films by marking ○ for two or less scratches, Δ for two to less than five scratches, and X for five or more scratches.

3) Light Resistance

Differences in color b value of the hard coating films were measured before and after exposure to UV-B from UV lamp for 72 hr or longer.

4) Transmittance and Haze

The hard coating films were measured for transmittance and haze using a spectrophotometer (brand name: COH-400).

5) Curl Property at High Humidity and Temperature

After a hard coating film piece with dimensions of 10 cm×10 cm was stored for 72 hr in a chamber maintained at a temperature of 85° C. and a humidity of 85%, it was placed on a flat plane. A maximal distance at which each edge of the piece was apart from the plane was measured.

6) Cylindrical Bending Test

Each of the hard coating films was wound on a cylindrical mandrel having a diameter of 1 cm such that the first hard coating layer was positioned as the outermost layer. When the hard coating film was not cracked, it was evaluated as OK. If the hard coating film was cracked, it was evaluated as X.

7) Impact Resistance

The impact resistance of each of the hard coating films was evaluated by determining whether or not each of the hard coating films was cracked when a 22 g steel ball was freely dropped ten times on the second hard coating layer from a height of 50 cm. Each of the hard coating films was evaluated as OK when it was not cracked, and as X when cracked.

The results of the physical properties measured in each of the hard coating films are summarized in Table 2 below.

TABLE 2

|  | Ex. 1 | Ex. 2 | Ex. 3 | Ex. 4 | Ex. 5 | Ex. 6 | Ex. 7 | C. Ex. 1 |
|---|---|---|---|---|---|---|---|---|
| Pencil Hardness | 8 H | 9 H | 8 H | 9 H | 8 H | 9 H | 9 H | 9 H |
| Scratch Resistance | ○ | ○ | ○ | ○ | ○ | ○ | ○ | ○ |
| Light Resistance | 0.20 | 0.18 | 0.25 | 0.20 | 0.23 | 0.28 | 0.25 | 0.42 |
| Transmittance | 92.0 | 92.2 | 92.0 | 92.5 | 92.2 | 92.0 | 92.2 | 92.1 |
| Haze | 0.3 | 0.3 | 0.2 | 0.2 | 0.4 | 0.4 | 0.3 | 0.2 |
| Bending Test | OK | OK | OK | OK | OK | OK | OK | X |
| Curl property at | 0.3 | 0.2 | 0.3 | 0.2 | 0.4 | 0.4 | 0.3 | 0.4 |

TABLE 2-continued

| | Ex. 1 | Ex. 2 | Ex. 3 | Ex. 4 | Ex. 5 | Ex. 6 | Ex. 7 | C. Ex. 1 |
|---|---|---|---|---|---|---|---|---|
| High Humidity & Temperature | mm | mm | mm | mm | mm | mm | mm | mm |
| Impact Resistance | OK | OK | OK | OK | OK | OK | OK | X |

As is apparent from Table 2, the hard coating films, wherein the elongation strain of the first hard coating layer was 4% or more, and the elastic modulus of the second hard coating layer was greater by at least 500 MPa than that of the first hard coating layer, were good in all the physical properties. In contrast, the hard coating film of Comparative Example 1 had insufficient impact resistance.

What is claimed is:

1. A hard coating film, comprising:
   a supporting substrate;
   a first hard coating layer, formed on one side of the supporting substrate and having an elongation strain of 4% to 12% in a stress-strain curve as measured by ASTM D882; and
   a second hard coating layer, formed on the other side of the supporting substrate,
   wherein the first hard coating layer has a first elastic modulus, and the second hard coating layer has a second elastic modulus, and the second elastic modulus is greater by 500 MPa to about 3000 MPa than the first elastic modulus.

2. The hard coating film of claim 1, wherein the first elastic modulus is 1500 MPa or less, and the second elastic modulus is 2000 MPa or more.

3. The hard coating film of claim 1, wherein the first and second hard coating layers independently comprise a photocurable crosslinking copolymer of a tri- to hexa-functional acrylate monomer, the photocurable crosslinking copolymer of the first hard coating layer being identical to or different from that of the second hard coating layer.

4. The hard coating film of claim 3, wherein the first and second hard coating layers independently comprise a photocurable crosslinking copolymer of a mono- to bi-functional acrylate monomer in addition to the tri- to hexa-functional acrylate monomer, the photocurable crosslinking copolymer of the first hard coating layer being identical to or different from that of the second hard coating layer.

5. The hard coating film of claim 3, wherein the first and second hard coating layers independently comprise a photocurable crosslinking copolymer of a photocurable elastic polymer in addition to the tri- to hexa-functional acrylate monomer, the photocurable crosslinking copolymer of the first hard coating layer being identical to or different from that of the second hard coating layer.

6. The hard coating film of claim 5, wherein the photocurable elastic polymer has an elongation of 15 to 200%, as measured by ASTM D638.

7. The hard coating film of claim 5, wherein the photocurable elastic polymer comprises at least one selected from the group consisting of polycaprolactone, a urethane acrylate polymer and polyrotaxane.

8. The hard coating film of claim 5, wherein the polyrotaxane comprises a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

9. The hard coating film of claim 3, wherein the second hard coating layer further comprises inorganic particles dispersed in the photocurable crosslinking polymer.

10. The hard coating film of claim 1, wherein thicknesses of the first and second hard coating layers are identical or different, and independently range from 50 to 300 μm.

11. The hard coating film of claim 3, wherein the tri- to hexa-functional acrylate monomer comprises at least one selected from the group consisting of trimethylolpropane triacrylate (TMPTA), trimethylolpropane ethoxy triacrylate (TMPEOTA), glycerin-propoxylated triacrylate (GPTA), pentaerythritol tetraacrylate (PETA) and dipentaerythritol hexaacrylate (DPHA).

12. The hard coating film of claim 1, wherein the supporting substrate includes at least one selected from consisting of polyethyleneterephthalate (PET), ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) and a fluorine resin.

13. The hard coating film of claim 1, wherein the hard coating film does not crack when a 22 g steel ball is freely dropped ten times thereon from a height of 50 cm.

14. The hard coating film of claim 1, exhibiting a pencil hardness of 7H or more at a load of 1 kg.

15. The hard coating film of claim 1, wherein the hard coating film allows two or less scratches to appear thereon after it is doubly rubbed 400 times with a steel wool #0000 under a load of 500 g.

16. The hard coating film of claim 1, having a light transmittance of 91% or more, a haze of 0.4 or less, and a color b* value of 1.0 or less.

17. The hard coating film of claim 1, wherein the hard coating film has a color b* value after exposure to UV-B for 72 hr which differs from a pre-exposed, color b* value by 0.5 or less.

18. The hard coating film of claim 1, wherein when the hard coating film is disposed on a plane after exposure to a temperature of 50° C. or higher at a humidity of 80% or higher for 70 hr or longer, each edge or side of the hard coating film is spaced apart from the plane by 1.0 mm or less, maximally.

19. The hard coating film of claim 1, further comprising on the first hard coating layer or the second hard coating layer at least one layer selected from the group consisting of a plastic resin film, an adhesive film, a releasable film, an electrically conductive film, an electrically conductive layer, a coating layer, a curable resin layer, a non-conductive film, a metal mesh layer and a patterned metal layer.

* * * * *